March 26, 1957     R. DAVIES ET AL     2,786,363

TORUS RING FOR INFINITELY VARIABLE TRANSMISSION

Filed May 31, 1955     2 Sheets-Sheet 1

INVENTORS
Robert Davies &
Francis E. Heffner
BY
W. C. Middleton
ATTORNEY

United States Patent Office 2,786,363
Patented Mar. 26, 1957

2,786,363

TORUS RING FOR INFINITELY VARIABLE TRANSMISSION

Robert Davies, Centerline, and Francis E. Heffner, Detroit, Mich., assignors to General Motors Corporation, Detroit, Mich., a corporation of Delaware Application May 31, 1955, Serial No. 511,994

7 Claims. (Cl. 74—200)

This invention relates to a friction drive transmission adapted to provide an infinitely variable number of speed ratios with a minimum amount of loss due to slip between the friction surfaces.

The use of drive and driven torus members having a plurality of rotating wheels or disks therebetween adapted to be driven and to drive by frictional contact with the drive and driven torus members, respectively, is well known in the art. The usual design consists of torus drive and driven members having friction faces generated by rotating a substantially semi-circular line about an axis, the torus members facing one another and being connected by rotatable wheels therebetween, which transmit the drive to the driven torus member by frictional contact therewith.

The wheels can be tilted to vary the speed at which they drive the driven torus member. The speed of the driven member will vary from speeds greater than that of the driving member to those that are less as the points of contact between the rotatable wheels and the driven torus member move along the torus shell away from the axis of rotation of the torus. The linear speed of a point on the driven torus member at its outer periphery is greater than the linear speed of a point at its hub, and the rate of angular rotation of the hub is determined by the linear speed of the wheel at the point of contact divided by the radius or distance of the point of contact from the torus axis.

Such a configuration acts like a planetary gear system with the wheels being the planet gears, the drive torus being the driving gear member, which could be either a sun or ring gear, and the driven torus member being the driven member of the gear unit, which also could be the ring gear or sun gear depending upon which is the drive gear. In addition, this unit corresponds to a planetary gear unit having the planet carrier fixed. Movement or tilting of the axes of the rotatable wheels has the effect of automatically changing the gear sizes in a planetary unit to provide an infinite number of speed ratios.

In a friction drive transmission of this type, the design of the rotatable wheels and the torus curvatures with which they contact is important, because improper or insufficient contact of the wheel and torus section at points where the wheel is driving or being driven results in slipping of the wheel in relation to the torus with a corresponding generation of heat and wearing down of the edges of the wheel and torus surfaces. This tends to burn up or wear the friction surfaces and produce an inefficient unit that is costly to maintain.

The ideal design would be to use a wheel having a zero thickness so as to ensure complete contact with the torus member at the edge of the wheel. Since it is impossible to manufacture such a thin wheel having the necessary contact stress resistance, an alternative method must be used to decrease the inherent slippage at separated points of contact of the wheel with points on the torus members, which latter points are at different distances from the axis.

Therefore, it is an object of this invention to decrease the slippage and wear at the points of contact between the rotatable wheels and torus members of an infinitely variable friction drive transmission.

It is a further object of this invention to reduce the slippage at points of contact between the rotatable wheels and torus members of an infinitely variable friction type transmission by designing the torus members so that, for each position of the axis of each of the wheels, the lines tangent to the generating curve of the torus surface at the points of contact of the wheel and the torus members will always intersect the axis of rotation of the wheel at a point where the wheel axis intersects the torus axis of rotation.

It is a further object of this invention to provide an infinitely variable friction drive transmission having the torus members of such shapes that, for each position of the axis of each of the wheels, the lines tangent to the generating curves of the torus surfaces at the points of contact with the wheel are elements of a cone having its vertex at the intersection of the axis of rotation of the wheel and the torus axis, with the base of the cone being the wheel itself.

Other features, advantages and objects will become apparent by reference to the detailed description of the invention and to the drawings wherein.

Figure 1:
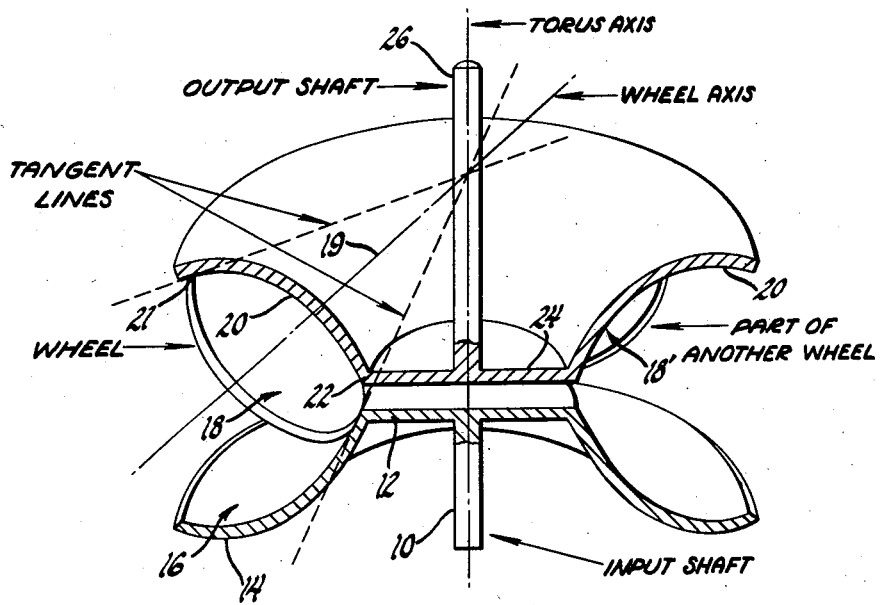
Figure 1 is a schematic drawing illustrating an embodiment of the present invention.
Figure 2:
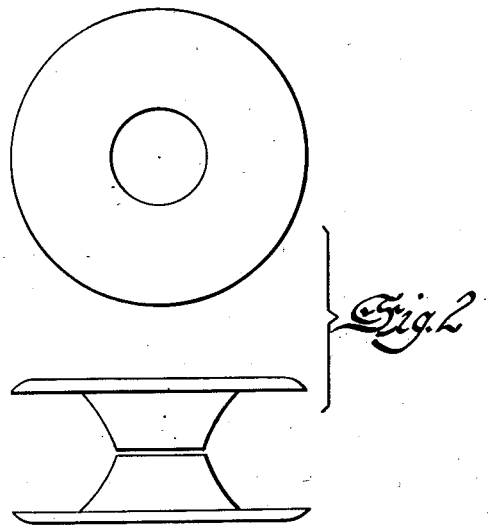
Figure 2 is a schematic plan and elevational view of the torus members.

Referring to the drawings and more particularly to Figure 1, 10 indicates a shaft adapted to be rotated by any suitable means having a flange 12 at one end thereof forming the hub of a driving torus member 14. On the inner portion of torus member 14 is a friction face 16 adapted to cooperate with a plurality of rotatable friction disks 18, 18', equally spaced around the hub of the torus members and contacting a driven torus 20. While only two wheels are shown, it will be obvious that any number could be used without changing the spirit of the invention. The axis of rotation of each of the plurality of disks or wheels is adapted to be tilted at the same time and by the same amount as the others. Therefore, the movement of only one will be described. The disk or wheel 18 is rotatable about an axis 19, which is adapted to be tilted or moved to an infinite number of different positions in which the wheel contacts both torus members by any suitable means (not shown). Movement of the wheel axis varies the speed ratio between torus members 14 and 20. The torus member 20 has on its inside portion a friction face 21 adapted to be driven by said disks. Connected to said torus 20 at its hub 22 is a flange 24 formed on one end of a driven shaft 26.

Prior to this invention, the working surface of the entire cross section of the torus including both torus halves was usually circular in shape, with the center of the wheel remaining fixed relative to the two halves of the torus as the axis of rotation of the wheel changed in the plane of the cross section. The two edges of the wheel were the same radial distance from the wheel axis, consequently, the circumference was the same at the two edges. However, the two paths which the edges traced on the torus were at unequal distances from the torus axis due to the thickness of the wheel, and therefore the paths were of different lengths. Because the distance around the wheel at the two edges was the same, both edges had the same linear speed whereas the edges were forced to roll in contact with paths of unequal length on the torus. Therefore, at least one edge of the wheel had to slip. This slippage could be reduced by making the wheel thin enough to have a single point contact, however, the contact stresses would make such a design impractical. Also, the wheel surface could be formed of a soft conforming substance such as rubber or the like, but the distortion would have to be greater than would be permitted by the material.

Applicants have solved this problem by creating a torus member that will decrease the slippage without increasing the stresses. It is well known that two cones can roll over each other without slipping if their vertices are at the same point, even though the angles of the two cones are different. Similarly, the slippage between the wheel and torus can be reduced by having the two contact along a cone whose vertex is at the intersection of the torus axis and wheel axis. The point of intersection of the two axes is different for each speed ratio because the direction of the wheel axis changes. The cross section of a torus, designed to accomplish nearly conical contact is shown in Figure 1. The wheels or disks 18, 18', are made with a friction surface having a soft conforming substance, such as rubber or the like. In this case, the distortion is small. The tangents to the torus at the points where the wheel and torus contact pass through the intersection of the wheel axis and torus axis. The torus cross section is not circular, and therefore the center of the wheel does not remain fixed relative to the two halves of the torus as the direction of the wheel axis changes. Accordingly, the distance of the center of the wheel to each half of the torus members, measured along a line parallel to the torus axis, changes as the wheel axis changes direction. The center of the wheel is kept, however, at a fixed radial distance from the torus axis. The tangents to the generating curves of the torus surfaces at the points of contact of the wheel with the drive and driven torus members are elements of a cone having the wheel as a base and a vertex at the point of intersection of the wheel axis with the torus axis. The tangent line at the point of contact of the wheel and driven torus member is also an element of a second cone "meshing" or rolling in contact, in effect, with the first cone to produce conical contact at this point. An infinite number of angles of cone elements will be formed as the wheel axis is tilted, each cone having its vertex intersecting the wheel axis at the torus axis.

The equation defining the shape of the torus members must satisfy the requirement that for each position of the rotatable wheel axis, the tangents to the generating lines of the torus surfaces at the points of contact of the wheel and torus members intersect the wheel axis at the torus axis to produce conical contact at those points. The slope or derivative of the curve at any particular point is defined as the change in the $y$ coordinate, which is the distance of the point away from the $x$-axis, as seen in Figure 3, divided by the change in the $x$ coordinate, which is the distance of the point away from the $y$-axis or the torus axis, as also seen in Figure 3.

This is expressed mathematically by the following equation:

$$(1) \qquad f'(x) = \frac{\Delta y}{\Delta x}$$

Figure 3:
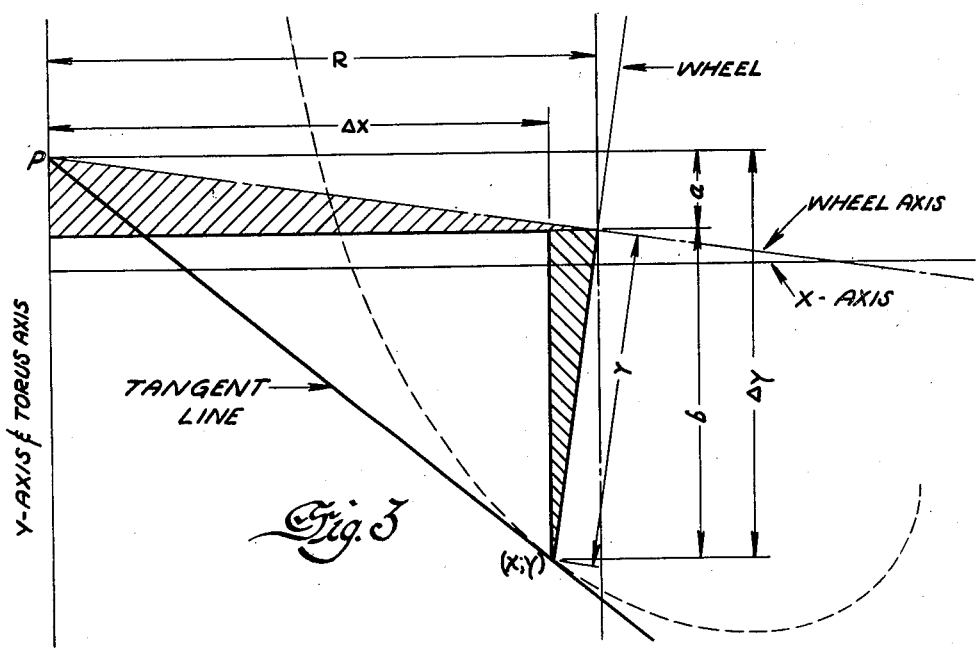
Figure 3 is a graph illustrating how the torus curvature is obtained.

By reference to Figure 3, the equation defining the slope of the curve at point $(x, y)$ having conical contact of the wheel and torus can be found. Since the tangent must pass through point P on the torus axis, the slope or derivative of the curve at $(x, y)$ which is expressed by Formula 1, is obtained with the following known quantities. The point $(x, y)$ is a particular point of contact on the torus, $r$ the radius of the wheel and R the distance from the torus axis of rotation (the $y$-axis) to the center of the wheel, a quantity which is constant for all positions of the wheel. The wheel axis intersects the torus axis at P. The distance from point $(x, y)$ to P along the $x$-axis is $-x$, and therefore $$\Delta x = -x$$

If $\Delta y$ is the distance from point $(x, y)$ along the $y$-axis to P, then $$\Delta y = a + b$$

The two shaded triangles being similar because their corresponding sides are perpendicular, from the law of similar triangles, $$\frac{a}{R} = \frac{R-x}{b}$$

Also, from the law of right triangles, since $$b = \sqrt{r^2 - (R-x)^2}$$

then $$a = \frac{R(R-x)}{b} = \frac{R(R-x)}{\sqrt{r^2 - (R-x)^2}}$$

By substitution, $$\Delta y = a + b = \frac{R(R-x)}{\sqrt{r^2 - (R-x)^2}} + \sqrt{r^2 - (R-x)^2}$$

and $$\Delta x = -x$$

Therefore, the slope of the curve or derivative of the curve at point $(x, y)$ may be expressed as follows:

$$(2) \qquad f'(x) = \frac{\Delta y}{\Delta x} = \frac{\frac{R(R-x)}{\sqrt{r^2 - (R-x)^2}} + \sqrt{r^2 - (R-x)^2}}{-x}$$

$$= \frac{-R+x}{\sqrt{r^2 - (R-x)^2}} + \frac{-r^2}{x\sqrt{r^2 - (R-x)^2}}$$

Since the equation for the slope at a particular point $(x, y)$ is known, to satisfy the conical contact requirement, the equation for the curve or shape of the torus members must be such that its derivative will give the above Equation 2.

Figure 4:
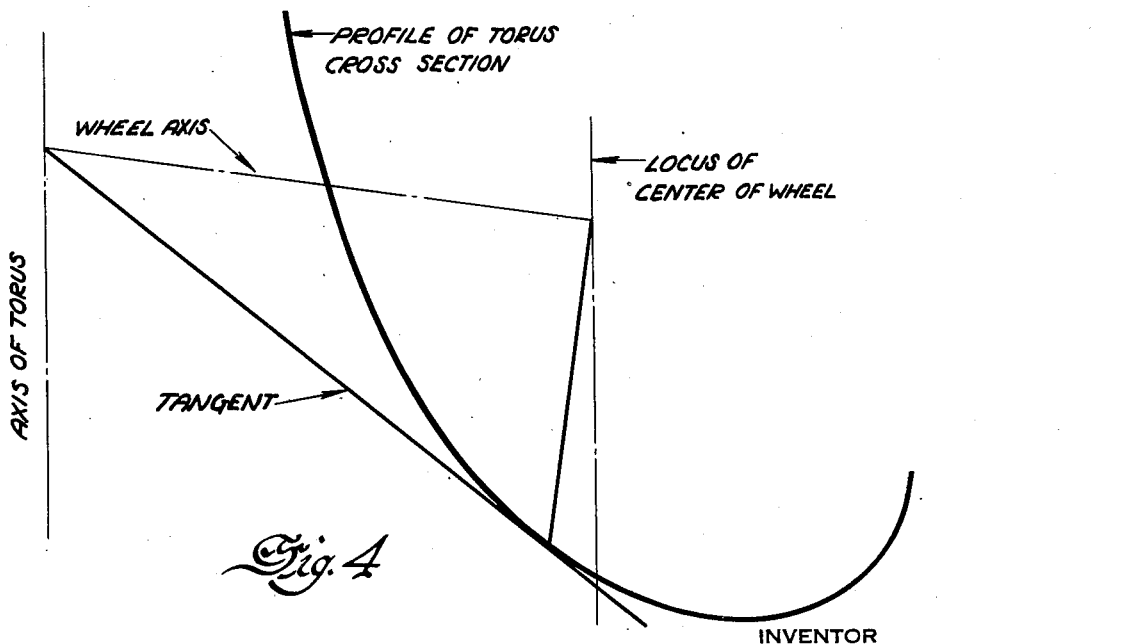
Figure 4 is another graph showing the profile of the torus cross section.

Therefore, Equation 2 is integrated to obtain $$(3)$$

$$f(x) = -\sqrt{r^2 - (R-x)^2} - \frac{r^2}{\sqrt{R^2 - r^2}} \left[ \arcsin \frac{r^2 - R^2 + Rx}{rx} - \arcsin \frac{r}{R} \right]$$

which is the equation defining the torus shape as shown in dotted lines in Figure 3 and more clearly in full lines in Figure 4.

All that remains to be done is to put in particular values of the known quantities to obtain a point on the curve for those values, then connecting all the points together to define the torus curvature.

In this particular embodiment, the constant of integration has been selected in order to have the $f(R) = -r$. Under this condition, the center of the wheel is on the $x$-axis when the wheel axis is perpendicular to the torus axis. However, it will be obvious that the choice of the constant of integration may be varied at will because changing it merely corresponds to moving the torus along its axis, or equivalently, to moving the reference plane from which distances are measured.

In the normal operation of this device, upon rotation of drive shaft 10, driving torus member 14 will rotate, rotating the plurality of disks or wheels 18, 18' having frictional contact with the driving torus. Axis 19 is stationary at this time to provide a reaction member for driving the wheels. Rotation of wheels 18, 18' causes driven disk 20 to rotate, thereby driving output shaft 26, which is connected to said driven torus. Whether the driven member will be driven at a speed equal to, less than, or greater than the speed of the drive member will depend upon the amount the wheel axis is rotated in the plane of the cross section. The wheel axis may be rotated at will by any suitable means (not shown).

From the foregoing it will be seen that the present invention provides a friction drive transmission wherein the slip and wear of the friction surfaces at the points of contact between the wheels and the torus members is reduced to a minimum, thereby providing a highly efficient infinitely variable speed ratio driving mechanism. It will be understood that the invention can be modified beyond the illustrated embodiments, and, therefore, any limitations to be imposed are those set forth in the following claims.

We claim:

1. A friction drive transmission having rotatable drive and driven members, torus elements connected to said members having friction faces thereon, and rotatable wheel elements having friction edges cooperating with said torus faces to be driven by and to drive said torus elements, the axis of rotation of said wheel elements being tiltable to a plurality of positions, said torus elements having shapes such that for each position of the rotatable wheel axis, lines drawn tangent to the faces of said torus members at the points of contact between a wheel and the torus members are elements of a cone having a vertex at the torus axis, the center of each wheel element being maintained at a fixed radial distance from the axis of rotation of the torus elements for all rotations of the wheel elements.

2. A friction transmission having rotatable drive and driven torus members, and a rotatable wheel between said members adapted to be driven by and drive said drive and driven members, respectively, by frictional contact, said wheel having a movable axis, said wheel having a center maintained at a fixed radial distance from the axis of rotation of the torus members throughout the movements of said movable axis, said torus members being shaped such that for each position of the movable wheel axis, lines drawn tangent to the faces of said torus members at the points of contact between said wheel and said torus members intersect the wheel axis at the torus axis, said shapes providing complete contact between said wheel and said torus members.

3. A friction drive transmission having rotatable drive and driven torus members, and rotatable disks mounted therebetween adapted to cooperate therewith, said disks adapted to be driven by and to drive said drive and driven torus members, respectively, by frictional contact, said disks each having a movable axis about which it rotates, said axis in its movement being capable of being spaced an unequal distance from said torus members to ensure complete contact between said wheel and torus members while maintaining the center of said wheel at a fixed radial distance from the axis of rotation of said torus members.

4. In a friction drive transmission having rotatable drive and driven members, and a rotatable element therebetween, said element adapted to be driven by and to drive said drive and driven members, respectively, the axis of rotation of said element being capable of being moved to change the drive ratio between said drive and driven members, and means to reduce the slippage at the points of contact between said element and members comprising mounting the axis of said rotatable element for movement to points between said members wherein the said axis is spaced a greater distance from one of said members than the other while maintaining the center of said wheel at a fixed radial distance from the axis of rotation of said torus elements for all movements of said axis.

5. A transmission comprising, rotatable drive and driven members, a rotatable element therebetween adapted to be driven by and to drive said drive and driven members, respectively, to produce a plurality of speed ratios, said rotatable element having a movable axis, said axis being movable to a plurality of positions to vary the speed ratio between said members, some of said positions being at points wherein the center of said element is at a greater distance from one of said members than the other to reduce the slippage between the points of contact of the elements and the members, all positions of the axis having the center of said rotating element at a fixed radial distance from the axis of rotation of said members.

6. A friction drive transmission having rotatable drive and driven members, torus elements connected thereto having friction faces thereon, and a rotatable wheel cooperating with said torus members and adapted to have frictional contact therewith, said wheel having a rotatable axis, said torus members being of such shapes that for each position of the rotatable axis, tangent lines drawn at the points of contact between the wheel and said torus members intersect said wheel axis at the torus axis of rotation to reduce slippage a the points of contact, said wheel axis being movable to positions wherein the cener of said wheel is a greater distance from one of said torus members than the other, said wheel axis in its movement maintaining the center of the wheel at a fixed radial distance from the axis of rotation of the torus elements at all times.

7. A friction drive transmission comprising, drive and driven torus members rotatable about a common axis, and a rotatable wheel element therebetween adapted to be driven by and to drive said drive and driven torus members respectively, the axis of said wheel element being movable about the center of said wheel, said wheel center being movable in a path parallel to the torus axis during the movement of said wheel axis to reduce the slippage between said torus members and said wheel element.

References Cited in the file of this patent

FOREIGN PATENTS

| | | |
|---|---|---|
| 673,168 | Great Britain | June 4, 1952 |
| 141,458 | Sweden | July 28, 1953 |